I. C. Bennett,
Gate.
No. 98,841. Patented Jan. 18, 1870.
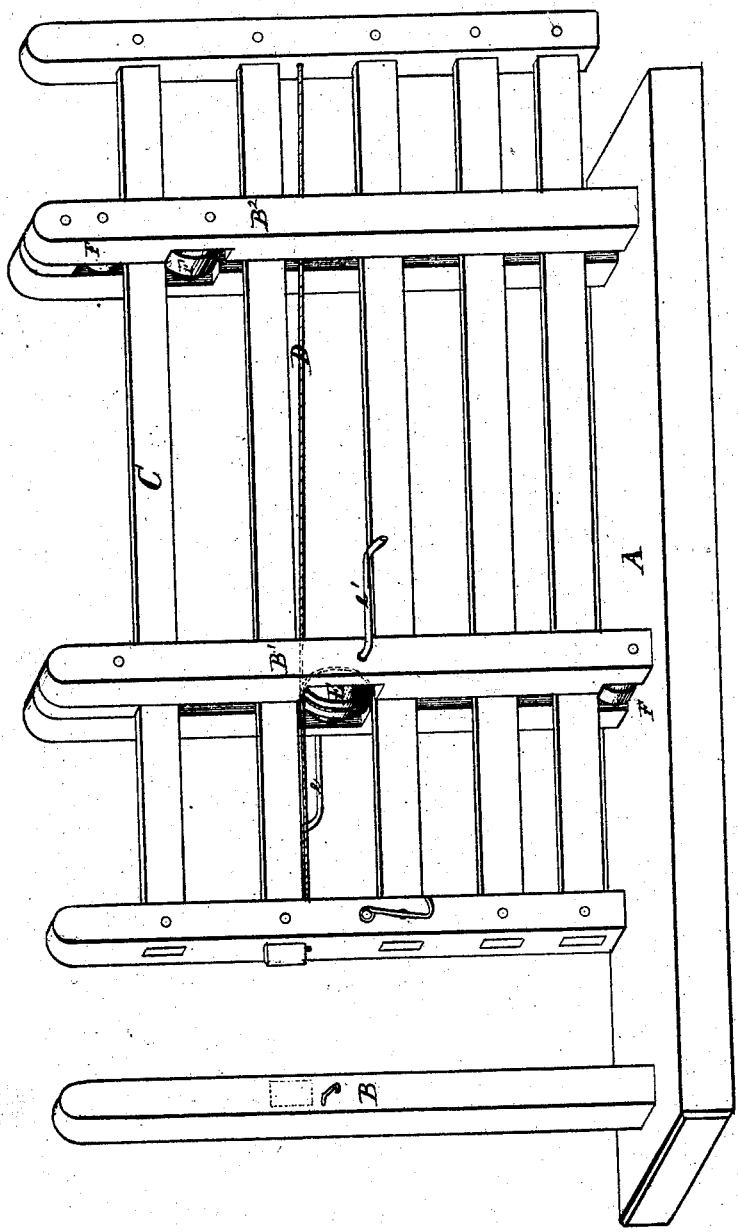
Witnesses:
Inventor:
Isaac C Bennett

UNITED STATES PATENT OFFICE.

ISAAC C. BENNETT, OF CLINTON, ILLINOIS.

IMPROVEMENT IN GATES.

Specification forming part of Letters Patent No. 98,841, dated January 18, 1870; antedated January 3, 1870.

*To all whom it may concern:*

Be it known that I, ISAAC C. BENNETT, of Clinton, in the county of DeWitt, and in the State of Illinois, have invented new and useful Improvements in Gates; and I do hereby declare that the following is a full, clear, and exact description thereof, reference being had to the accompanying drawing, and to the letters of reference marked thereon.

The figure represents a perspective view of the gate.

My invention relates to an improvement in gates; and it consists in placing the same on friction-rollers, between double posts, and opening and closing it by means of a crank and sheave, around the latter of which a rope or chain, extending from one end of the gate to the other, passes once, as hereinafter more fully explained.

To enable those skilled in the art to make and use my invention, I will proceed to describe its construction and operation.

A in the drawings represents the bed or sill on which the posts are mounted. For the sake of economy this sill may be dispensed with and the posts be firmly embedded in the earth.

B, B', and B² represent the posts, which are equidistant from each other. B is a single post, and is on that side which faces the others provided with a notch, which receives the end of one of the bars of the gate when closed, to give it stability. It also has a staple on the outside to receive the hook on the gate when the same is closed. B' and B² are double posts, between the two uprights of which, forming such double posts, sufficient space is left for the bars of the gate to slide in. Above the uppermost of the bars the uprights are united.

C represents the gate proper, the form of which may be such as shown in the figure of the drawings. It slides between the uprights forming the double posts, and its length is equal to the distance between the outer sides of posts B and B². When closed, one of the stiles of the gate abuts against the inner side of post B, its protruding bar extending into the notch in same, while its other stile abuts against the outer side of post B². When opened, the first-mentioned stile abuts against the middle post, B'.

D represents a rope or chain, one end of which is fastened to one of the stiles, then passed along in a horizontal direction and passed once around a sheave, which is hung at the proper height between the uprights of the center double post, and then continued to the other stile and fastened thereto.

E represents the sheave, which is hung between the uprights of the center post, between two bars of the gate. Its journals extend through the uprights, and are then provided with cranks $e\,e'$, by which it is revolved and the gate opened and closed.

F represents friction-rollers hung between the uprights of the double posts, as clearly shown in the figure of the drawing. They are intended to support the gate, and at the same time assist in moving it easily.

It is apparent that a pinion-wheel may be used instead of a sheave and rope or chain, said pinion-wheel meshing into a rack secured to the under side of that bar of the gate immediately above it.

I do not claim, broadly, operating the gate by means of the cord and pulley; but

What I claim is—

The double posts B' B², with pulley E, operating between the posts B' and between two bars of the gate, in combination with the line D, pulleys F, crank $e\,e'$, and the gate.

The above specification signed by me this 5th day of May, 1869.

ISAAC C. BENNETT.

Witnesses:
SOLOMON F. LEWIS,
CHARLES H. DENNETT.